May 5, 1959

S. REIS 2,884,812

AUTOMATIC SPEED CHANGING TRANSMISSION FOR ROTARY MOTION

Filed Oct. 7, 1957

INVENTOR.

May 5, 1959 — S. REIS — 2,884,812
AUTOMATIC SPEED CHANGING TRANSMISSION FOR ROTARY MOTION
Filed Oct. 7, 1957 — 2 Sheets-Sheet 2

INVENTOR.

United States Patent Office 2,884,812
Patented May 5, 1959

2,884,812

AUTOMATIC SPEED CHANGING TRANSMISSION FOR ROTARY MOTION

Smil Reis, Milan, Italy

Application October 7, 1957, Serial No. 688,769

Claims priority, application Italy November 14, 1956

5 Claims. (Cl. 74—751)

This invention relates to means for transmitting rotary motion from a driving to a driven member, and provides an epicyclic arrangement of helical gears having two speed ratios which are engaged alternately and automatically by the action of the tooth pressures of the helical gears, and by resilient means, arranged to counter-act said tooth pressures.

Epicyclic arrangements of gears consist, as is well known, of a central driving gear, a central driven gear, and an intermediate carrier of gears termed planets. Said planets are in permanent mesh with said central gears and revolve around the latter with planetary motion. Said central gears and the planet carrier are co-axial and rotatable on their mutual axis.

According to this invention, the planet carrier in an epicyclic arrangement of helical gears is mounted axially slidable, provision being made for means to stop said planet carrier from turning, when it is urged axially by the tooth pressures to one operative position, thus obtaining one speed ratio, resilient means to counter-act said tooth pressures and urge said planet-carrier to another operative position, opposite said one operative position, and means to connect solidly said planet carrier to one of said central gears at said other operative position, thus obtaining another speed ratio.

Multi-speed automatic speed changing transmissions, according to this invention, are obtained by interconnecting a plurality of epicyclic gear units of the kind described, so that the driven member of any unit is at the same time driving member of the following unit of said plurality.

The substance of the invention and its advantages will appear hereinafter more completely from the specification and the appended drawings, which are referred to present and preferred embodiments.

Figure 1:
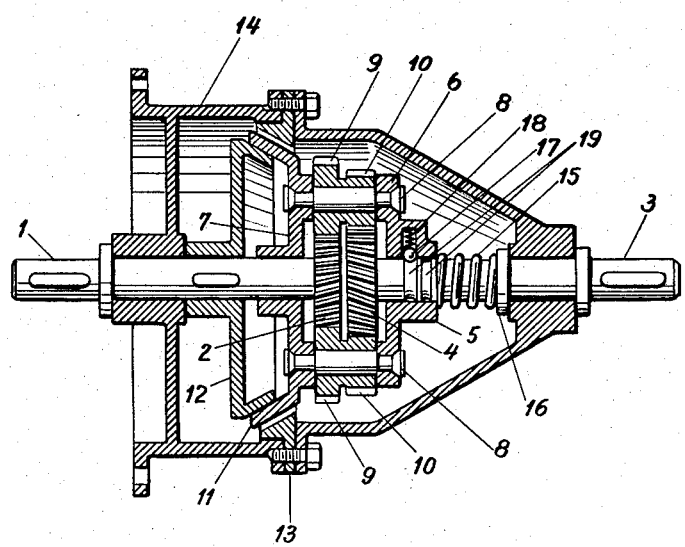
Fig. 1 shows diagrammatically one embodiment of a two-speed automatic speed changing transmission.

With reference to Fig. 1, a shaft 1 is fastened to a central driving gear 2 and a second shaft 3 is fastened to a central driven gear 4. Said shafts and central gears are arranged co-axially one behind the other. A planet carrier 5 is arranged rotatable and axially slidable on said shafts 1 and 3. The planet carrier 5 is formed by two side members 6 and 7, which are connected to each other through shafts 8, carrying rotatable compound planets formed by pinions 9 and 10, said pinions being co-axially and solidly connected to each other. The compound planets 9—10 are in permanent mesh respectively with the central driving gear 2 and the driven gear 4. All gears and planets have helical teeth.

A cone-shaped member 11 is secured to one side member (7 in the example described) of the planet carrier 5. The cone-shaped member 11 is situated between a conjugated cone-clutch drum 12 which is secured to the driving shaft 1, and a conjugated brake ring 13, fastened to the case 14, which houses the transmission gear.

A spring 15, reacting on a retainer 16 fixed to the driven shaft 3, urges the planet carrier 5 and the cone-shaped member 11, against the clutch drum 12. Thus, the planet carrier 5 is solidly connected to the driving shaft 1 through the clutch 11—12 and will turn with said driving shaft 1 at the same speed. Consequently, also the driven gear 4 and the shaft 3 will be forced to turn at the speed of shaft 1, through the planets 9—10, which are prevented from turning on their own shafts 8, because there is no relative motion between the gear 2 and the planet carrier 5. The transmission will thus be in direct drive.

It will be observed that, by the described gear arrangement, motion is transmitted from the driving gear 2 to the driven gear 4, always through the meshing teeth of the planet pinion 10 and the gear 4, and that the inclination of said teeth is selected so, that under load, the planet pinion 10, and therefore also the planet carrier 5 will be urged by the axial component of the tooth pressure, against the pressure of spring 15.

When the resistance to motion of the shaft 3, increases so that the urge due to said axial component of said tooth pressure overcomes the pressure of spring 15, the clutch 11—12 is released and the planet carrier 5 is shifted against the brake ring 13. In this case, the planet carrier will be stopped from turning and motion will be transmitted from the driving gear 2 to the driven gear 4 through the compound planets 9—10, which will revolve now on their own shafts 8, these shafts being locked to the transmission case 14 with the planet carrier 5. Owing to the gear ratio of the involved gear train 2—9—10—4, the driven shaft 3 will turn at a speed which is different from that of the driving shaft 1, and an automatic gear change will thus have been effected. If the resistance to motion of the shaft 3 drops so that the spring 15 overcomes the axial tooth pressure component, the planet carrier 5 will be urged again to engage the clutch 11—12, and direct drive from shaft 1 to shaft 3 will be automatically restored.

To prevent the planet carrier 5 from remaining in some case half way between the drum 12 and the brake ring 13, a retainer ball 17 as shown in Fig. 1, loaded by a spring 18, and carried by said planet carrier 5, may be arranged to engage in notches 19 of the shaft 3, so that the shifts towards either the drum 12, or the brake ring 13, can start only after a certain amount of drop, respectively raise, in tooth pressure, has been reached.

Figure 2:
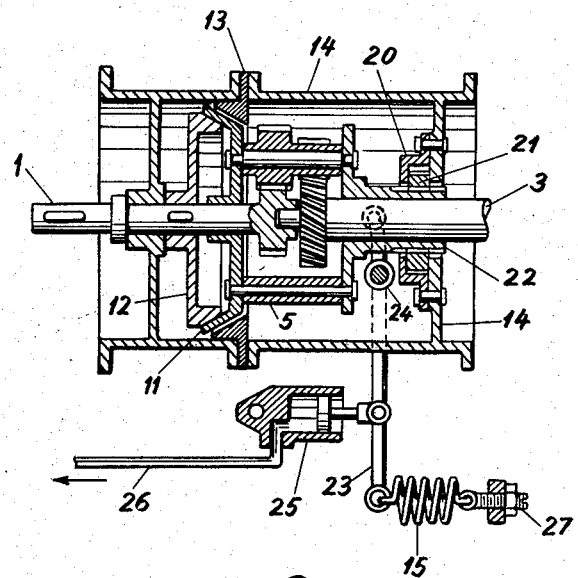
Fig. 2 shows diagrammatically another embodiment of a two-speed automatic speed changing transmission.

Further, to prevent backward rotation of the planet carrier 5, especially when said planet carrier cannot be made heavy enough to resist such backward rotation by its own inertia while the cone-shaped member 11 is half way between the drum 12 and the brake ring 13, a well known one-way brake, may be arranged between said planet carrier 5 and the case 14 of the transmission gear as shown in Fig. 2.

A one-way clutch, as is well known, comprises mainly a driving member, a driven member, and intermediate members arranged in such operative relation, that the driven member is allowed to overrun the driving member when the speed of the former is higher than that of the latter, while in the opposite case, said driving and driven members are locked to each other.

With reference to Fig. 2, the driving member 20 of a one-way brake is fastened to the transmission case 14, and the driven member 21 is mounted slidably on a splined hub 22 of the planet carrier 5. By this arrangement, the planet carrier 5 will be allowed to turn freely in the normal direction, and will be stopped in the opposite one.

With further reference to Fig. 2, it will be seen that the spring 15 has been arranged to act on the planet carrier 5 through the intermediate of a double arm lever 23, whose pivot 24 is fixed to the transmission case 14. In this arrangement, the spring 15 is anchored to a screw 27 through which the spring tension can be adjusted. Furthermore, when the automatic transmission is used in a motor vehicle, it is important to have the spring tension automatically adjusted in accordance to the engine torque, which is transmitted to the driving shaft 1. To this end, as shown in Fig. 2, a vacuum cylinder 25 is connected through a pipe 26 to the inlet manifold of the engine (which is not shown in the drawing) and the piston of said cylinder 25 is connected to the lever 23 so as to counteract the spring pressure. In this way, all or a fraction of the spring pressure will be balanced by the vacuum of said manifold, said vacuum raising proportionally to the drop in engine torque, and therefore, the remaining spring pressure will result proportional to said engine torque.

It will further be seen that the lever 23 can be drawn by hand or through power operated mechanism, against the tension of the spring 15, so that the planet carrier 5 is relieved from the spring pressure and the speed ratio can be changed by the tooth pressure. In this way, hand or power operated speed changes can be effected at will, outdoing the automatic feature.

Figure 3:
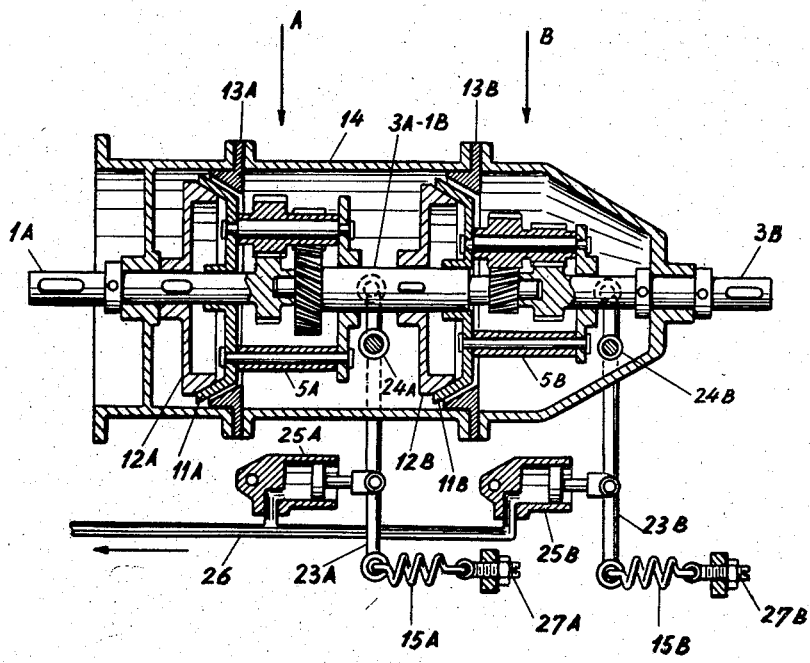
Fig. 3 shows diagrammatically a four-speed automatic speed changing transmission.

The automatic two-speed transmission unit hereunto described, may be arranged to form a multi-speed transmission, as shown in Fig. 3 with reference, by way of example, to a four-speed transmission. To this end, with reference to Fig. 3, two (or more) two-speed automatic transmission units of the kind hereunto described, are connected so that the driven shaft 3A of one unit A, is at the same time the driving shaft 1B of the following unit B. In this case, when the resistant torque of the final driven shaft 3B is lower than the driving torque of the first driving shaft 1A, the transmission will be in direct drive; when the resistant torque of the shaft 3B is higher than the driving torque of shaft 1A, and the intermediate torque of the shaft 3A—1B is higher than those of both shafts 1A and 3B, one speed ratio will be obtained; when said intermediate torque of shaft 3A—1B is lower than those of shafts 1A and 3B, the resistant torque of shaft 3B being higher than the driving torque of shaft 1A, another speed ratio will be obtained; finally, when the resistant torque of shaft 3B is higher than the intermediate torque of shaft 3A—1B, and the latter is higher than the driving torque of shaft 1A, still another speed ratio will be obtained.

I claim:

1. An automatic speed changing transmission for rotary motion comprising in combination in a stationary case: a driving shaft and a central driving gear fixed thereon; in alignment therewith, a driven shaft and a central driven gear fixed thereon; a planet carrier rotatable and axially slidable on said shafts; rotary planet gear mounted on said carrier, each planet having a first gear rim in permanent mesh with one of said central gears, and a second gear rim in permanent mesh with the other of said central gears, at least one of said central gears and the planet gear rims in mesh therewith, having helical gear teeth to develop under load, axial thrust urging said planet carrier to one operative position; means on said planet carrier, and means fixed to said stationary case, arranged to stop in co-action, the rotation of said planet carrier at said one operative position; resilient means to counteract said axial thrust of said helical gears and urge said planet carrier to a second operative position whenever said axial thrust is less than the power of said resilient means; means on said planet carrier and means secured to one of said shafts, arranged to solidly connect in co-action, said one shaft and said planet carrier, whenever said planet carrier is at said second operative position.

2. An automatic speed changing transmission as in claim 1, comprising means operatively connected to said planet carrier and the case of the transmission for preventing the planet carrier from turning in a direction opposite to the direction of rotation of the driving shaft.

3. An automatic speed changing transmission as in claim 1, comprising means in co-action with said planet carrier and one of said driving or driven shafts, to delay the axial shifts of said planet carrier and prevent said carrier from remaining in a position intermediate between said operative positions.

4. An automatic speed changing transmission as claimed in claim 1, comprising power actuated means responsive to the driving torque on said driving central gear to automatically adjust the power of said resilient means in accordance with said driving torque.

5. An automatic speed changing transmission as in claim 1, comprising hand or power operated means to counteract said resilient means and relieve the pressure of said resilient means from said planet carrier.

References Cited in the file of this patent

UNITED STATES PATENTS

| | | |
|---|---|---|
| 696,285 | Vrand et al. | Mar. 25, 1902 |
| 1,239,379 | Fountain | Sept. 4, 1913 |
| 1,869,543 | Cheswright | Aug. 2, 1932 |
| 2,292,079 | Joyce | Aug. 4, 1942 |
| 2,708,017 | Orr et al. | May 10, 1955 |

FOREIGN PATENTS

| | | |
|---|---|---|
| 6,612 | Great Britain | Mar. 16, 1911 |
| 698,403 | France | Jan. 30, 1931 |